(12) United States Patent
Nakano et al.

(10) Patent No.: US 11,116,019 B2
(45) Date of Patent: *Sep. 7, 2021

(54) DATACENTER, COMMUNICATION APPARATUS, COMMUNICATION METHOD, AND COMMUNICATION CONTROL METHOD IN A COMMUNICATION SYSTEM

(71) Applicant: NEC CORPORATION, Tokyo (JP)

(72) Inventors: Shintaro Nakano, Tokyo (JP); Hideo Hasegawa, Tokyo (JP); Satoru Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,795

(22) Filed: Feb. 12, 2020

(65) Prior Publication Data

US 2020/0187278 A1 Jun. 11, 2020

Related U.S. Application Data

(63) Continuation of application No. 16/248,628, filed on Jan. 15, 2019, now Pat. No. 10,609,742, which is a
(Continued)

(30) Foreign Application Priority Data

Mar. 4, 2015 (JP) .................................. 2015-042268

(51) Int. Cl.
*H04W 76/30* (2018.01)
*H04W 76/12* (2018.01)
(Continued)

(52) U.S. Cl.
CPC ............ *H04W 76/12* (2018.02); *H04L 67/28* (2013.01); *H04M 3/00* (2013.01); *H04W 24/04* (2013.01);
(Continued)

(58) Field of Classification Search
CPC ... H04W 76/022; H04W 24/04; H04W 76/06; H04L 67/10
See application file for complete search history.

(56) References Cited

U.S. PATENT DOCUMENTS

| 7,324,498 | B2 | 1/2008 | Ahn et al. | |
|---|---|---|---|---|
| 2003/0134643 | A1* | 7/2003 | Pedziwiatr | ............ H04W 36/24 455/452.1 |

(Continued)

FOREIGN PATENT DOCUMENTS

| EP | 2 485 564 A1 | 8/2012 |
|---|---|---|
| JP | 2003-273921 A | 9/2003 |

(Continued)

OTHER PUBLICATIONS

Communication dated Nov. 19, 2018, from the European Patent Office in counterpart European Application No. 16758643.7.
(Continued)

*Primary Examiner* — Chuong A Ngo
(74) *Attorney, Agent, or Firm* — Sughrue Mion, PLLC

(57) ABSTRACT

A datacenter, a communication apparatus, a communication method, and a communication control method in a communication system are provided that can enhance the versatility of a datacenter and a virtual network constructed therein. A communication system includes: a plurality of wireless communication facilities owned by a plurality of network operators, respectively; and a datacenter in which a virtual core network is constructed, wherein the virtual core network implements mobile communication functions by using the plurality of wireless communication facilities.

13 Claims, 12 Drawing Sheets

FIRST EXEMPLARY EMBODIMENT

Related U.S. Application Data continuation of application No. 15/555,327, filed as application No. PCT/JP2016/001165 on Mar. 3, 2016, now Pat. No. 10,271,362.

(51) Int. Cl.
| | | |
|---|---|---|
| *H04M 3/00* | (2006.01) | |
| *H04W 84/00* | (2009.01) | |
| *H04W 88/14* | (2009.01) | |
| *H04W 92/14* | (2009.01) | |
| *H04L 29/08* | (2006.01) | |
| *H04W 24/04* | (2009.01) | |

(52) U.S. Cl.
CPC ........... *H04W 76/30* (2018.02); *H04W 84/00* (2013.01); *H04W 88/14* (2013.01); *H04W 92/14* (2013.01); *H04L 67/10* (2013.01)

(56) References Cited

U.S. PATENT DOCUMENTS

| | | | |
|---|---|---|---|
| 2013/0121207 | A1 | 5/2013 | Parker |
| 2013/0124712 | A1 | 5/2013 | Parker |
| 2013/0138814 | A1 | 5/2013 | Kotecha |
| 2013/0170471 | A1 | 7/2013 | Nix |
| 2013/0183991 | A1 | 7/2013 | Bosch et al. |
| 2014/0146673 | A1 | 5/2014 | Parker |
| 2014/0259012 | A1 | 9/2014 | Nandlall et al. |
| 2015/0063166 | A1 | 3/2015 | Sif et al. |
| 2015/0365848 | A1 | 12/2015 | Sawai |
| 2016/0227598 | A1* | 8/2016 | Singh ................ H04W 76/18 |

FOREIGN PATENT DOCUMENTS

| | | |
|---|---|---|
| JP | 2009-135662 A | 6/2009 |
| JP | 2013-541289 A | 11/2013 |
| WO | 2010146713 A1 | 12/2010 |
| WO | 2013/144747 A1 | 10/2013 |
| WO | 2013/161243 A1 | 10/2013 |
| WO | 2013170045 A2 | 11/2013 |
| WO | 2014/136058 A1 | 9/2014 |
| WO | 2014173426 A1 | 10/2014 |

OTHER PUBLICATIONS

Communication dated Oct. 23, 2018, from the Japanese Patent Office in counterpart application No. 2017-503353.
Juniper's SDN Strategy which changes the network architecture of the cloud and mobile,Business Communication,vol. 50,No. 5,Japan, Business Communication Co., Ltd., ,May 1, 2013,vol. 50, pp. 100-103 (4 pages).
Qualcomm Incorporated, "NFV What is there for 3GPP?", 3GPPTSG-SA#63, SP-140055, 3GPP, 2014.
Communication dated Oct. 8, 2019, from the Japanese Patent Office in application No. 2018-218988.
Trend, "Business Communication", vol. 51, No. 3, Business Communication Co., Ltd., 2014, pp. 68-69.
Communication dated Jul. 16, 2019, from the Japanese Patent Office in counterpart application No. 2018-218988.
Notice of Reasons for Refusal dated Jan. 6, 2020 from the Japanese Patent Office in application No. 2018-218988.
Hiroki Baba et al., "A Study of Core Network Selection Mechanism on multi-EPC environments," The Institute of Electronics, Information and Communications Engineers, IEICE Technical Report, Oct. 10, 2013, pp. 1-6, vol. 113, No. 244.
Hiromi Hirai et al., "An Evaluation of EPC Architecture Optimized for Future Mobile Communication Services," The Institute of Electronics, Information and Communications Engineers, IEICE Technical Report, Apr. 10, 2014, pp. 101-106, vol. 114, No. 6.
Communication dated Jun. 26, 2018 from the Japanese Patent Office in counterpart Japanese application No. 2017-503353.
"All of the SDN and NFV", the Nikkei BL, Dec. 12 ,2014, ( 8 pages total).
International Search Report of PCT/JP2016/001165 dated May 17, 2016.
Nao Kawanishi, et al., "A Vision of the Open Mobile Communication System with All Stratum Virtualization", IEICE Technical Report, The Institute of Electronics, Information and Communication Engineers, Jun. 10, 2016, vol. 110, No. 79, pp. 2-8 (7 pages total).
Communication dated Apr. 2, 2020 by the European Patent Office in application No. 16 758 643.7.
Japanese Office Action Corresponding to Japanese Patent Application No. 2020-080390 dated Jul. 27, 2021.

* cited by examiner

DATACENTER, COMMUNICATION APPARATUS, COMMUNICATION METHOD, AND COMMUNICATION CONTROL METHOD IN A COMMUNICATION SYSTEM

CROSS REFERENCE TO RELATED APPLICATIONS

This application is a continuation of U.S. application Ser. No. 16/248,628 filed Jan. 15, 2019 which is a Continuation of U.S. application Ser. No. 15/555,327 filed Sep. 1, 2017, now U.S. Pat. No. 10,271,362 issued Apr. 23, 2019, which is a National Stage of International Application No. PCT/JP2016/001165 filed Mar. 3, 2016, claiming priority based on Japanese Patent Application No. 2015-042268 filed Mar. 4, 2015, the disclosures of all of which are incorporated herein by reference in their entireties.

TECHNICAL FIELD

The present invention relates to a communication system including a datacenter, and more particularly to a communication technique and a communication control technique for the same.

BACKGROUND ART

In recent years, various services such as cloud services are provided by many mobile virtual network operators (MVNO: Mobile Virtual Network Operator). In general, an MVNO does not own a wireless communication facility and therefore, in many cases, leases an access network and a core network from a mobile network operator (MNO: Mobile Network Operator). For example, an MVNO leases base stations and a core network EPC (Evolved Packet Core) owned by an MNO and provides services to users' mobile terminals via the Internet as shown in FIG. 1 (for example, see PTL 1).

CITATION LIST

Patent Literature

[PTL 1]
International Publication No. WO2014/136058

SUMMARY

Technical Problem

MNOs have been promoting network functions virtualization (NFV: Network Functions Virtualization) and software-defined networking (SDN: Software-Defined Networking) in order to cope with increasing facilities and operation costs along with a recent increase in traffic volume. In such SDN/NFV environments, the virtualization of a core network has also been advanced, and it is conceivable that a virtual EPC (vEPC: virtual EPC) will be constructed within, for example, a datacenter of a cloud provider in the future.

If a virtual network is constructed within a datacenter, since an MVNO does not own a wireless communication infrastructure as described above, the MVNO needs to use an existing MNO's access network to be accessed from a terminal. If a plurality of MNOs own their respective access networks in particular, it is preferable that a virtual network within a datacenter be shared among the plurality of access networks.

Moreover, if an MVNO is a cloud provider, it is necessary that its cloud computing and a carrier's core network coexist within the cloud provider's own datacenter. Accordingly, traffic from cloud users and the carrier's traffic are accommodated concurrently, which brings about a problem of segregation between the cloud computing and the core network.

Accordingly, an object of the present invention is to provide a datacenter, a communication apparatus, a communication method, and a communication control method in a communication system that enable the efficient use of a datacenter and a virtual network constructed within the datacenter.

Solution to Problem

A communication system according to the present invention is characterized by including: a plurality of wireless communication facilities owned by a plurality of network operators, respectively; and a datacenter in which a virtual core network is constructed, wherein the virtual core network implements mobile communication functions by using the plurality of wireless communication facilities.

A datacenter according to the present invention is characterized by including: a gateway means for connecting to a plurality of wireless communication facilities owned by a plurality of network operators, respectively, over a network; and a computing means on which a virtual core network is constructed, wherein the virtual core network implements mobile communication functions by using the wireless communication facilities connected via the gateway means.

A communication apparatus according to the present invention is a communication apparatus within a datacenter and is characterized by including: a virtual core network that implements mobile communication functions by using a plurality of wireless communication facilities owned by a plurality of network operators, respectively; and a virtual path termination means for protecting traffic between the virtual core network and a terminal connected to each wireless communication facility.

A communication apparatus according to the present invention is a communication apparatus owned by a network operator and is characterized by including: at least one base station wirelessly connected to a terminal; and a gateway means for performing communication over a network with a virtual core network within a datacenter owned by another network operator, wherein mobile communication functions are implemented by the virtual core network and the at least one base station.

A communication method according to the present invention is characterized by including: by a plurality of network operators, owning a plurality of wireless communication facilities, respectively; within a datacenter, constructing a virtual core network that implements mobile communication functions by using the plurality of wireless communication facilities; and by the virtual core network, receiving traffic from the plurality of wireless communication facilities.

A communication control method according to the present invention is a communication control method in a datacenter and is characterized by including: by a gateway means, connecting to a plurality of wireless communication facilities owned by a plurality of network operators, respectively, over a network; and by a computing means, constructing a virtual core network that implements mobile communication functions by using the wireless communication facilities connected via the gateway means.

A communication control method according to the present invention is a communication control method for a communication apparatus within a datacenter and is characterized by including: by a virtual core network within the datacenter, implementing mobile communication functions by using a plurality of wireless communication facilities owned by a plurality of network operators, respectively; and by a virtual path termination means, protecting traffic between the virtual core network and a terminal connected to each wireless communication facility.

A communication control method according to the present invention is a communication control method for a communication apparatus owned by a network operator and is characterized by including: by at least one base station, wirelessly connecting to a terminal; by a gateway means, performing communication over a network with a virtual core network within a datacenter owned by another network operator; and by the virtual core network and the at least one base station, implementing mobile communication functions.

Advantageous Effects of Invention

As described above, according to the present invention, a virtual core network that implements mobile communication functions by using a plurality of wireless communication facilities owned by a plurality of network operators, respectively, is constructed within a datacenter, whereby it is possible to enhance the versatility of the datacenter and the virtual network constructed within it, and thus to achieve the efficient use of the virtual network.

DETAILED DESCRIPTION

Outline of Exemplary Embodiments

In communication systems according to exemplary embodiments of the present invention, a mobile virtual network operator (hereinafter, abbreviated as MVNO) constructs a virtual core network within a datacenter of its own, and implements mobile communication network functions by using wireless communication facilities owned by mobile network operators (hereinafter, abbreviated as MNO).

In a datacenter according to an exemplary embodiment of the present invention, a virtual core network constructed within it can process traffic from a plurality of MNOs' wireless communication facilities. Moreover, in a datacenter according to another exemplary embodiment of the present invention, a virtual core network and another virtual network that provides a cloud service are independently constructed, and traffic is distributed such that traffic from a plurality of MNOs' wireless communication facilities is transferred to the virtual core network, and traffic from users who use the cloud service is transferred to the other virtual network. Hereinafter, exemplary embodiments and examples of the present invention will be described in detail with reference to drawings.

1. First Exemplary Embodiment

According to a first exemplary embodiment of the present invention, a virtual core network is constructed within a datacenter, and the virtual core network within the datacenter performs communication control to process traffic from wireless communication facilities provided by a plurality of MNOs, allowing the versatility of the virtual core network to be enhanced.

1.1) System

Figure 1:
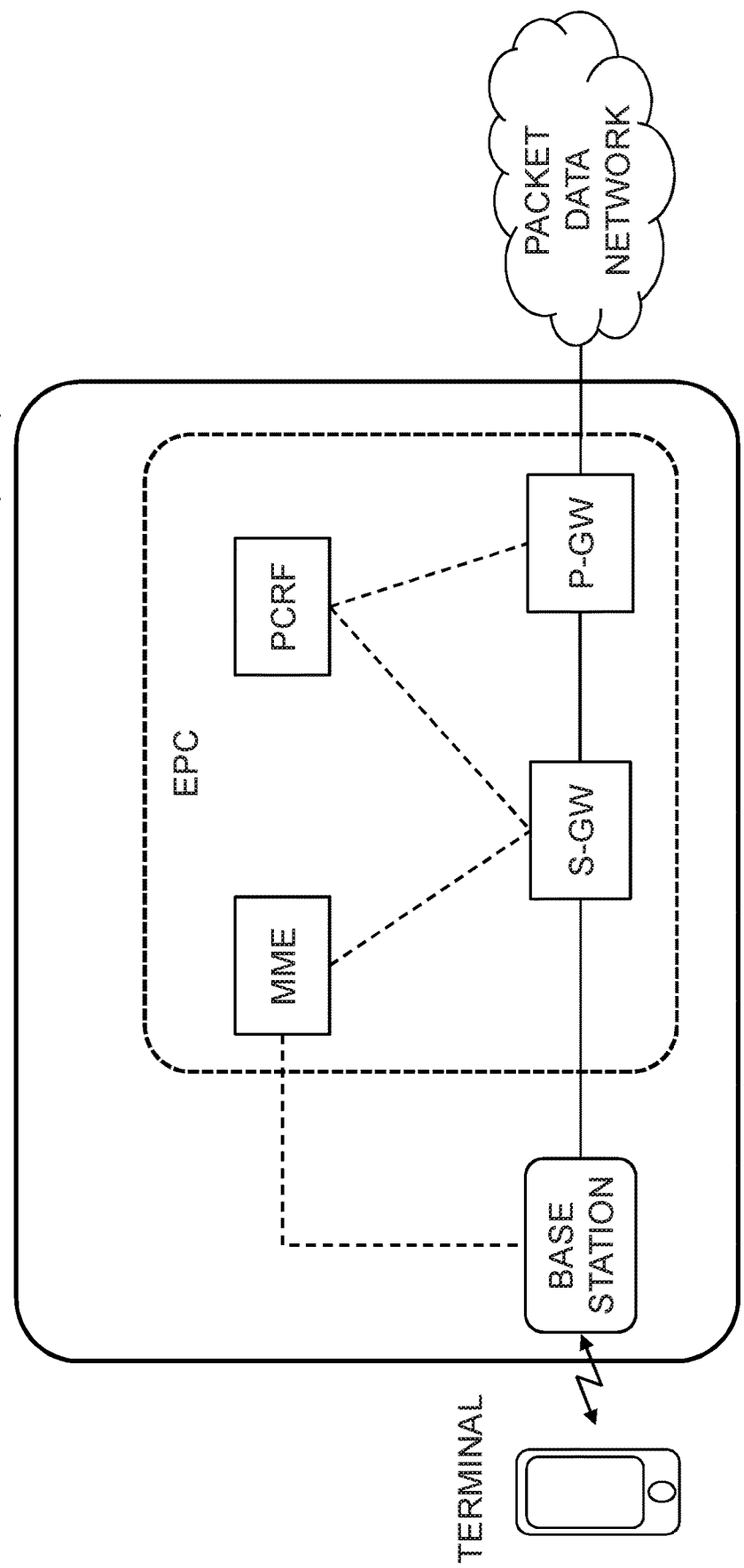
FIG. 1 is a block diagram showing an example of a wireless communication facility owned by an existing mobile network operator.
Figure 2:
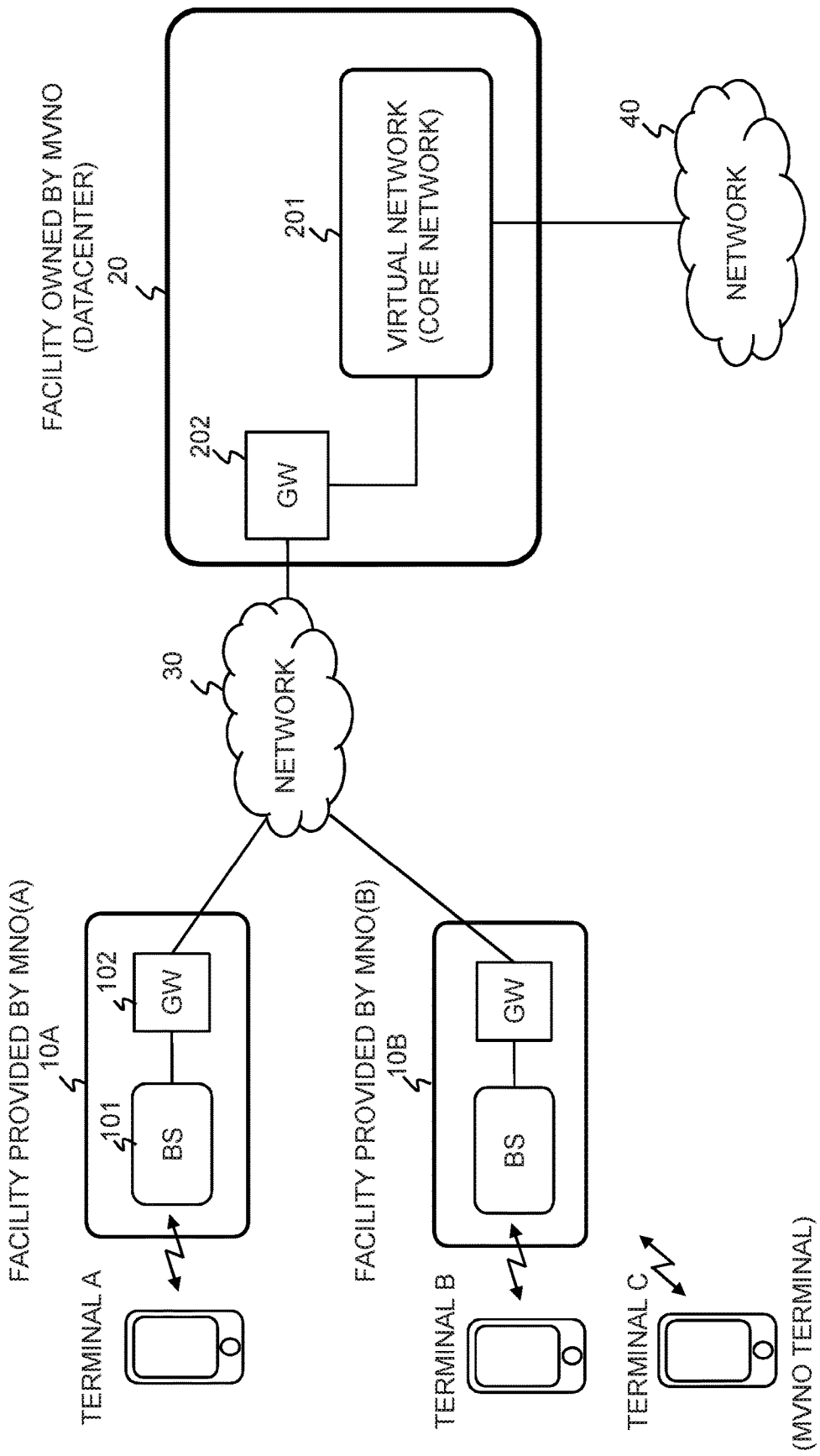
FIG. 2 is a network diagram showing the schematic architecture of a communication system according to a first exemplary embodiment of the present invention.

As illustrated in FIG. 2, a communication system according to the present exemplary embodiment includes a plurality of wireless communication facilities (10A, 10B), a datacenter 20, and a network 30 connecting the plurality of wireless communication facilities and the datacenter 20. In FIG. 2, it is assumed that different MNO(A) and MNO(B) own the wireless communication facilities 10A and 10B, respectively, and that an MVNO owns the datacenter 20.

The wireless communication facility 10A is part of the access network of a mobile communication network owned by the MNO(A) and is assumed to include at least a base station 101 and a gateway 102. Although one base station 101 is depicted here, an access network may be constructed including a plurality of base stations 101 (e.g., eUTRAN (Evolved Universal Terrestrial Radio Network)). Note that if the MNO(A) owns a core network, it is assumed that access from a terminal A does not pass through the core network of the MNO(A) by the gateway 102 offloading the MNO(A). The base station 101 performs wireless communication with the terminal A of a subscriber to the MNO(A). The gateway 102 connects to the datacenter 20 via the network 30. It is assumed that the wireless communication facility 10B basically has a similar configuration. Moreover, the MVNO's subscriber terminal (a terminal C) can also connect to the datacenter 20 via the network 30 by using the wireless communication facility of an MNO.

The datacenter 20 has a computing resource such as a computer, constructing a virtual network 201, which implements core network functions, and a gateway 202, which connects to the network 30. Preferably, the gateway 202 forms a dedicated physical channel, or a protected logical channel passing over the network 30, with the gateway 102 of each wireless communication facility. Thereby, the base station of each wireless communication facility and the virtual network 201 can be connected, and the virtual network 201 is thus able to accommodate the radio access networks of the different MNOs. Note that the virtual network 201 can be constructed by using resources which are, for example, a virtual machine, a switch, a router and the like configured on a physical server.

The network 30 is an IP network such as the Internet, a RAN (Radio Access Network), dedicated lines physically isolated from other networks, or the like that connects the wireless communication facilities 10A, 10B and other wireless communication facilities to the datacenter 20. Moreover, a network 40, which is connected to the virtual network 201, is an external packet network or an IP Network such as the Internet.

1.2) Datacenter

Next, a description will be given of the datacenter 20 in which the radio access networks of the different MNOs are accommodated in the virtual network 201. However, blocks having similar functions to those of the communication system shown in FIG. 2 are denoted by the same reference signs, and a detailed description thereof will be omitted.

First Example

Figure 3:
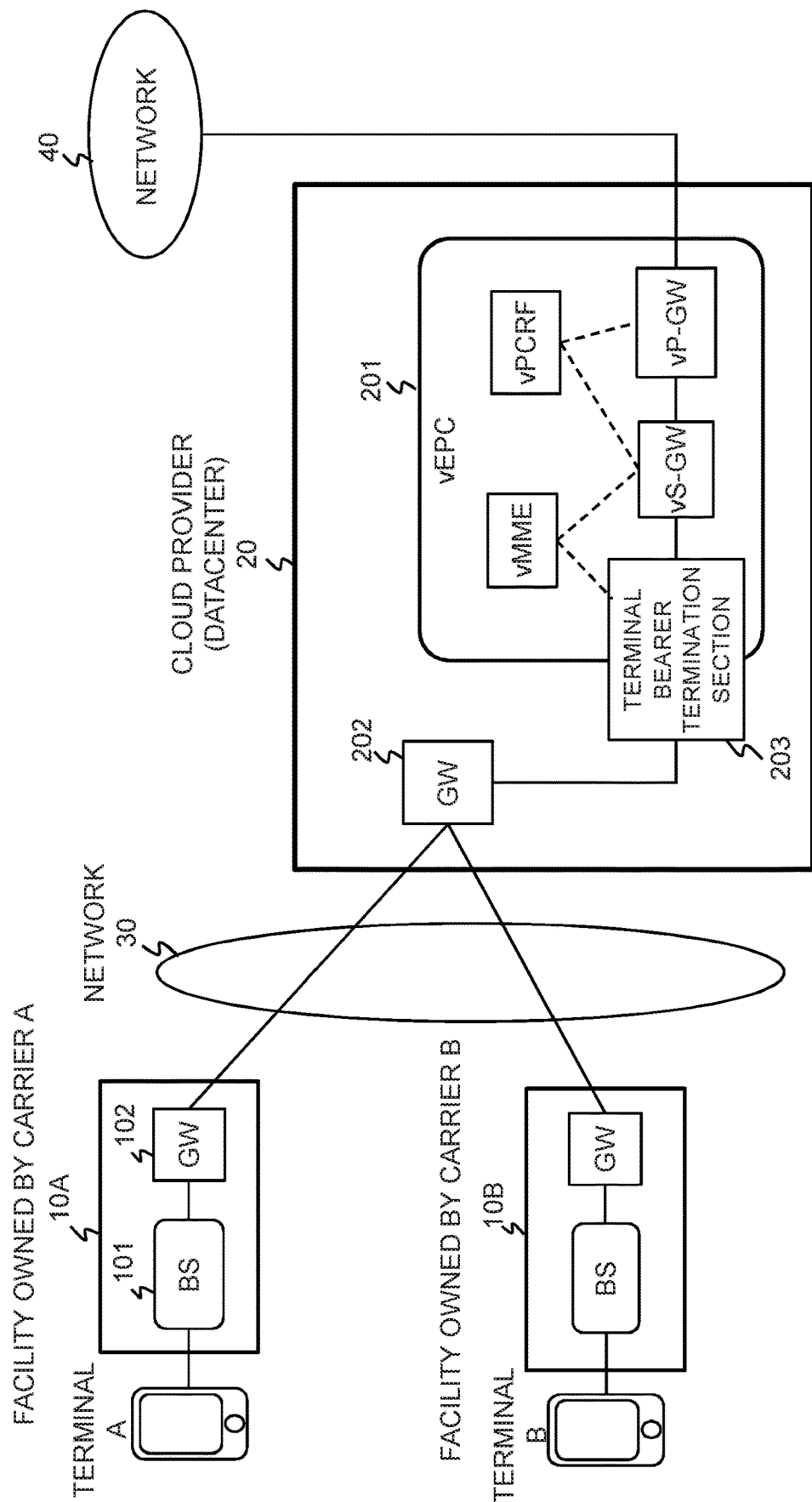
FIG. 3 is a network diagram showing the schematic architecture of a communication system according to a first example of the present invention.

As illustrated in FIG. 3, in a communication system according to a first example of the present invention, the virtual core network (vEPC) 201 is constructed within the datacenter 20 of the cloud provider (MVNO), and a terminal bearer termination section 203 for terminating a bearer of each terminal is provided at the front stage of the vEPC 201, that is, between an S-GW in the vEPC 201 and the gateway 202.

The vEPC 201 is implemented by, for example, a virtual machine on a server within the datacenter 20, per appliance or per individual function included in each appliance. The following are examples of such functions.

HSS (Home Subscriber Server):
  Function of managing subscriber information in the communication system.
RADIUS (Remote Authorization Dial In Service):
  Function of authenticating a user accessing the network (Authentication Function)
  Function of giving access authorization to an authenticated user (Authorization Function)
  Function of monitoring access for accounting management (Accounting Function)
P-GW:
  Function of processing packets (User-Plane Function)
  Function of managing charging status depending on communication (PCEF: Policy and Charging Enforcement Function)
  Function of controlling policies such as QoS (Quality of Service) (PCRF: Policy and Charging Rule Function)
  LI Function S-GW:
  Function of processing packets (User-Plane Function)
  Function of processing control signaling (C-Plane Function)
MME (Mobility Management Entity):
  Function of processing control signaling (C-Plane Function): for example, setup/release of a session for communication, handover control, and the like
  Function of managing subscriber information in the communication system in cooperation with HSS (Home Subscriber Server)

For example, the terminal A (the same applies to the terminals B and C) can access the Internet 40 via the vEPC 201 constructed within the datacenter 20 of the cloud provider by wirelessly connecting to the base station 101 of the carrier A (MNO(A)) to which this terminal subscribes. In case of EPS (Evolved Packet System) using E-UTRAN, the terminal A establishes a bearer (virtual path) with the vEPC 201 via the base station (eNodeB) 101 it has connected to. However, in the present example, the bearer is terminated between the terminal A and the terminal bearer termination section 203 disposed at the front stage of the vEPC 201, whereby the traffic with the terminal is protected end-to-end. Since a bearer is provided by encapsulating a packet, the terminal bearer termination section 203 can identify the access network of each carrier from the outer header of a packet. Hereinafter, operation in the first example will be described with reference to FIG. 4.

Figure 4:
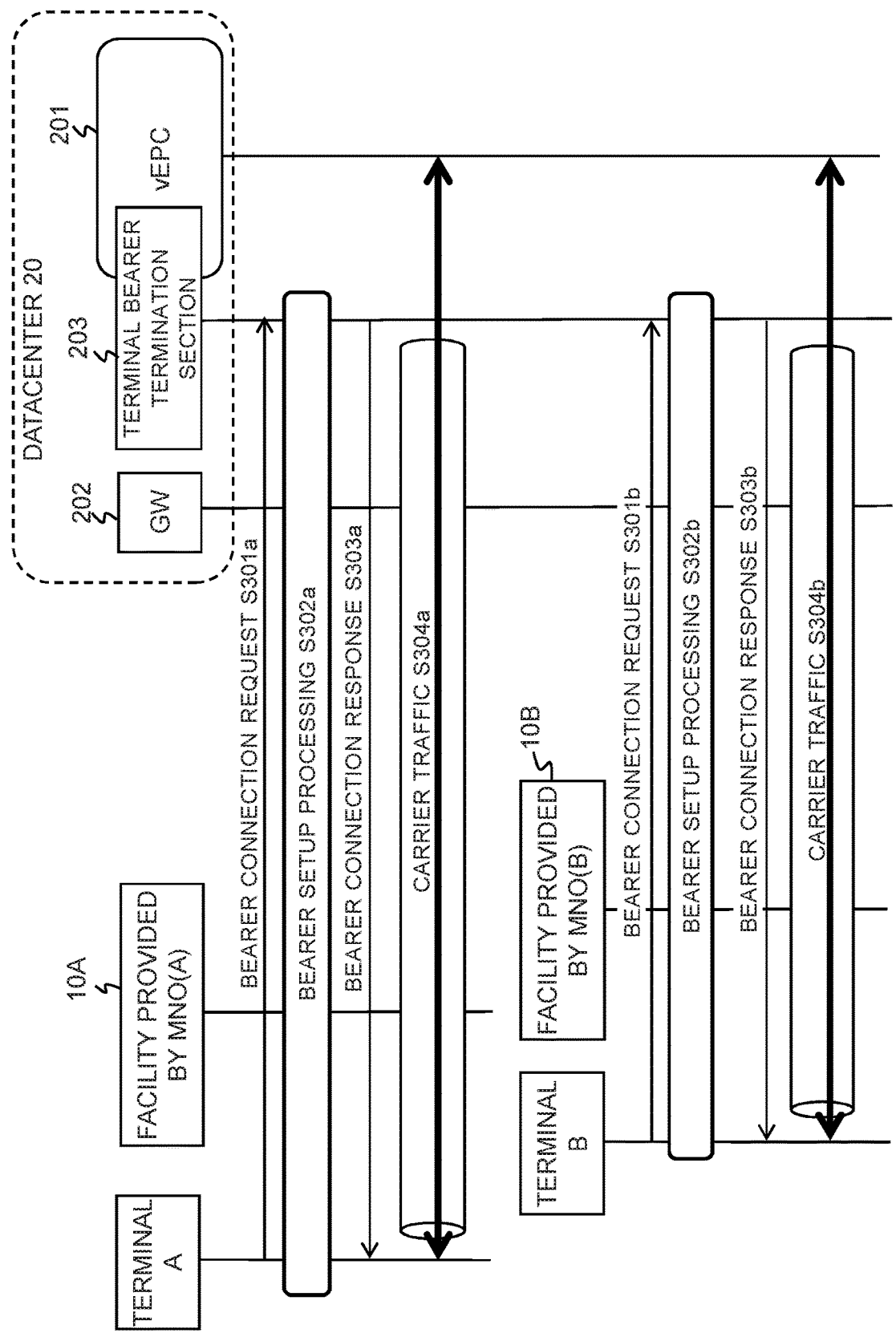
FIG. 4 is a sequence chart showing an example of operation in the communication system according to the first example.

Referring to FIG. 4, when the terminal A sends a bearer connection request to the vEPC 201 within the datacenter 20 via the facility (base station and GW) provided by the carrier A (MNO(A)) it subscribes to (Operation S301a), the terminal bearer termination section 203 provided at the front stage of the vEPC 201 terminates the request, and bearer setup processing is performed between the terminal A and the terminal bearer termination section 203 (Operation S302a). When a bearer connection response is sent from the terminal bearer termination section 203 to the terminal A (Operation S303a), a bearer is established between the terminal A and the terminal bearer termination section 203, and prescribed signals are exchanged between the terminal A and the vEPC 201 through this bearer (Operation S304a). Similarly, the terminal B sends a bearer connection request via the facility (base station and GW) provided by the carrier B (MNO(B)) it subscribes to (Operation S301b), bearer setup processing is performed between the terminal B and the terminal bearer termination section 203 (Operation S302b); a bearer connection response is sent from the terminal bearer termination section 203 (Operation S303a); prescribed signals are exchanged between the terminal B and the vEPC 201 through the bearer between the terminal B and the terminal bearer termination section 203 (Operation S304b). In this manner, the terminal bearer termination section 203 can identify a bearer with each terminal subscribing to each carrier, and each carrier traffic is protected by means of a setup bearer.

Note that the terminal bearer termination section 203 may be provided within the gateway 202 or the vEPC 201.

Second Example

Figure 5:
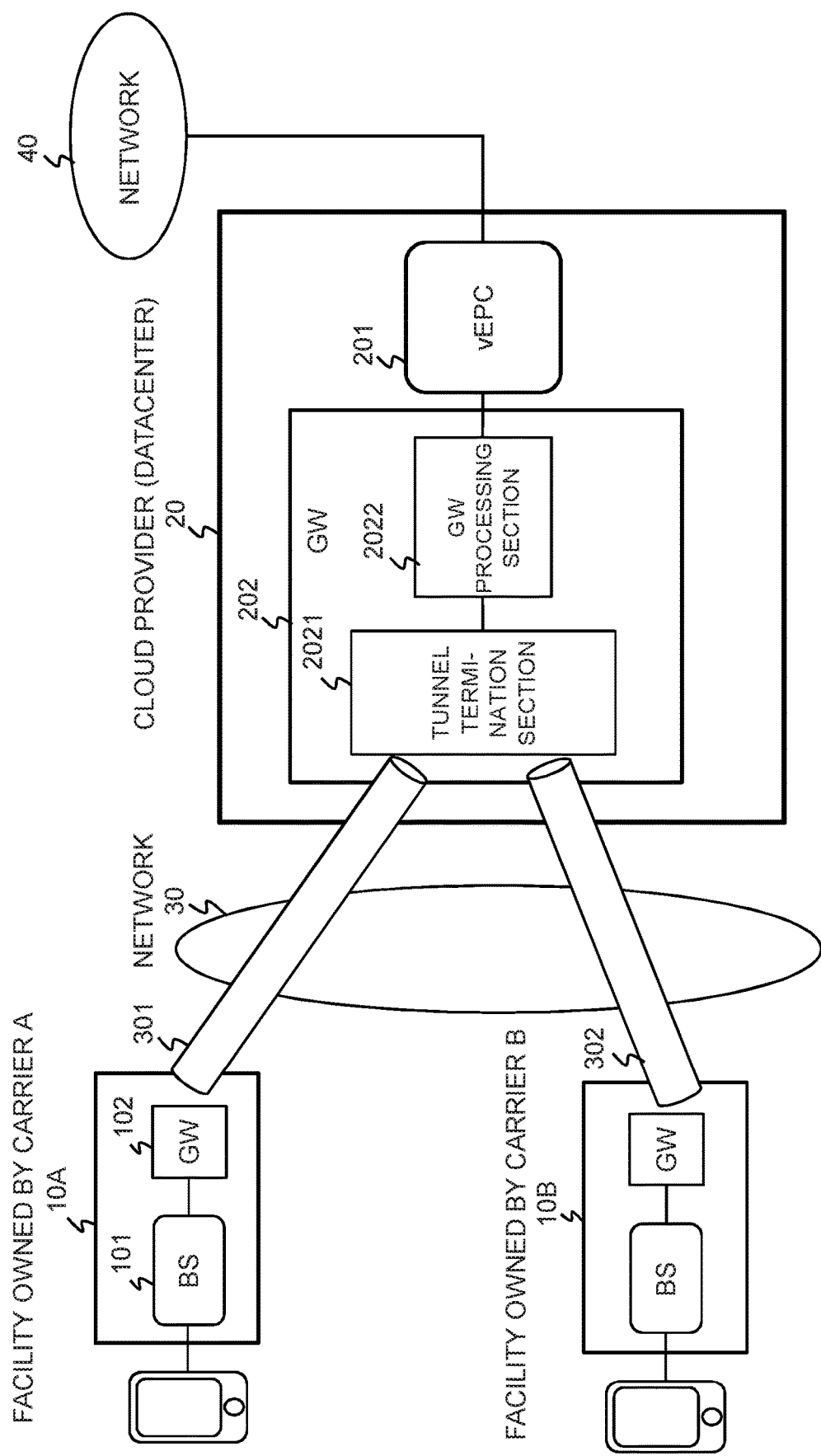
FIG. 5 is a network diagram showing the schematic architecture of a communication system according to a second example of the present invention.

As illustrated in FIG. 5, in a communication system according to a second example of the present invention, the virtual core network (vEPC) 201 is constructed within the datacenter 20 of the cloud provider (MVNO), and further provided is a function of terminating a virtual path (tunnel) set up over the network 30 with the facility owned by each carrier. According to the present example, a tunnel termination section 2021 and a gateway processing section 2022 are provided to the gateway 202.

The tunnel termination section 2021 terminates a tunnel 301 between itself and the wireless communication facility 10A owned by the carrier A and a tunnel 302 between itself and the wireless communication facility 10B owned by the carrier B individually. Note that if there is another wireless communication facility owned by the cloud provider, the tunnel termination section 2021 may terminate a tunnel between itself and that wireless communication facility. Accordingly, the gateway processing section 2022 can identify a packet from each radio access network and forward them to the vEPC 201. In this manner, traffic with a terminal is protected by means of a tunnel. Note that the vEPC 201 is as described in the first example.

Third Example

Figure 6:
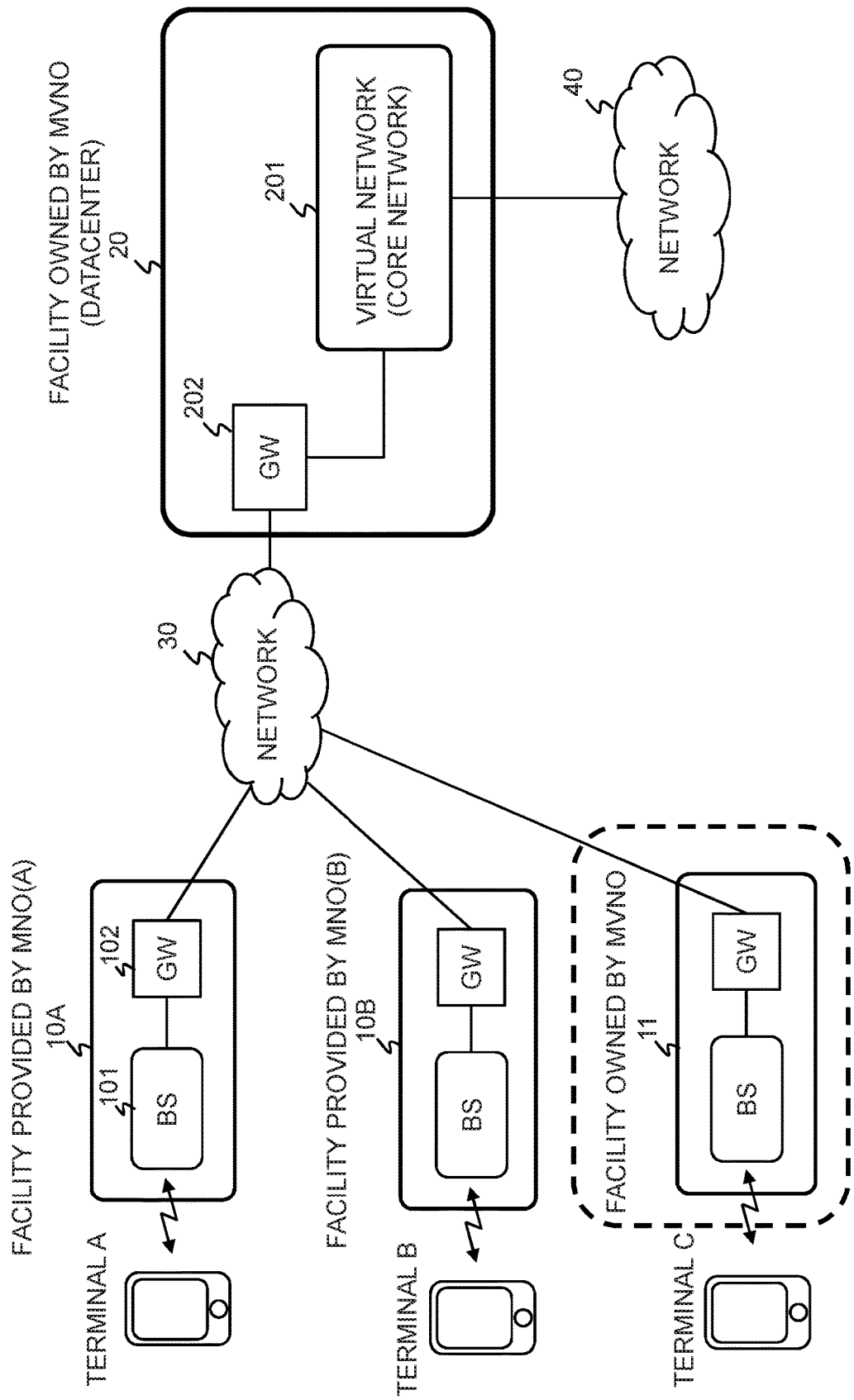
FIG. 6 is a network diagram showing the schematic architecture of a communication system according to a third example of the present invention.

As illustrated in FIG. 6, the cloud provider (MVNO) owning the datacenter 20 may own a wireless facility 11 such as a base station. For example, the facility owned by the MVNO includes a base station and a gateway GW, similarly to the facility 10A or 10B provided by an MNO. The terminal C subscribing to the MVNO can access the datacenter 20 via the wireless facility 11. Note that the third example can be combined with the above-described first or second example. That is, the terminal bearer termination section 203 may be provided at the front stage of the virtual network 201 as in the first example, or the tunnel termination section 2021 may be provided to the GW 202 as in the second example.

1.3) Effects

As described above, according to the first exemplary embodiment of the present invention, a virtual core network constructed within a datacenter can identifiably process traffic from radio access facilities provided by a plurality of MNOs. Accordingly, it is possible to implement the highly versatile datacenter supporting the radio access networks of the different MNOs and thus to achieve the efficient use of the virtual core network.

2. Second Exemplary Embodiment

According to a second exemplary embodiment of the present invention, a virtual core network for a carrier and a virtual network for providing a cloud service to users are independently constructed within a datacenter. Further, a distributing means is provided within the datacenter to divide and distribute traffic to either the virtual core network or the virtual network, whereby the versatility of the datacenter is enhanced.

2.1) System

Figure 7:
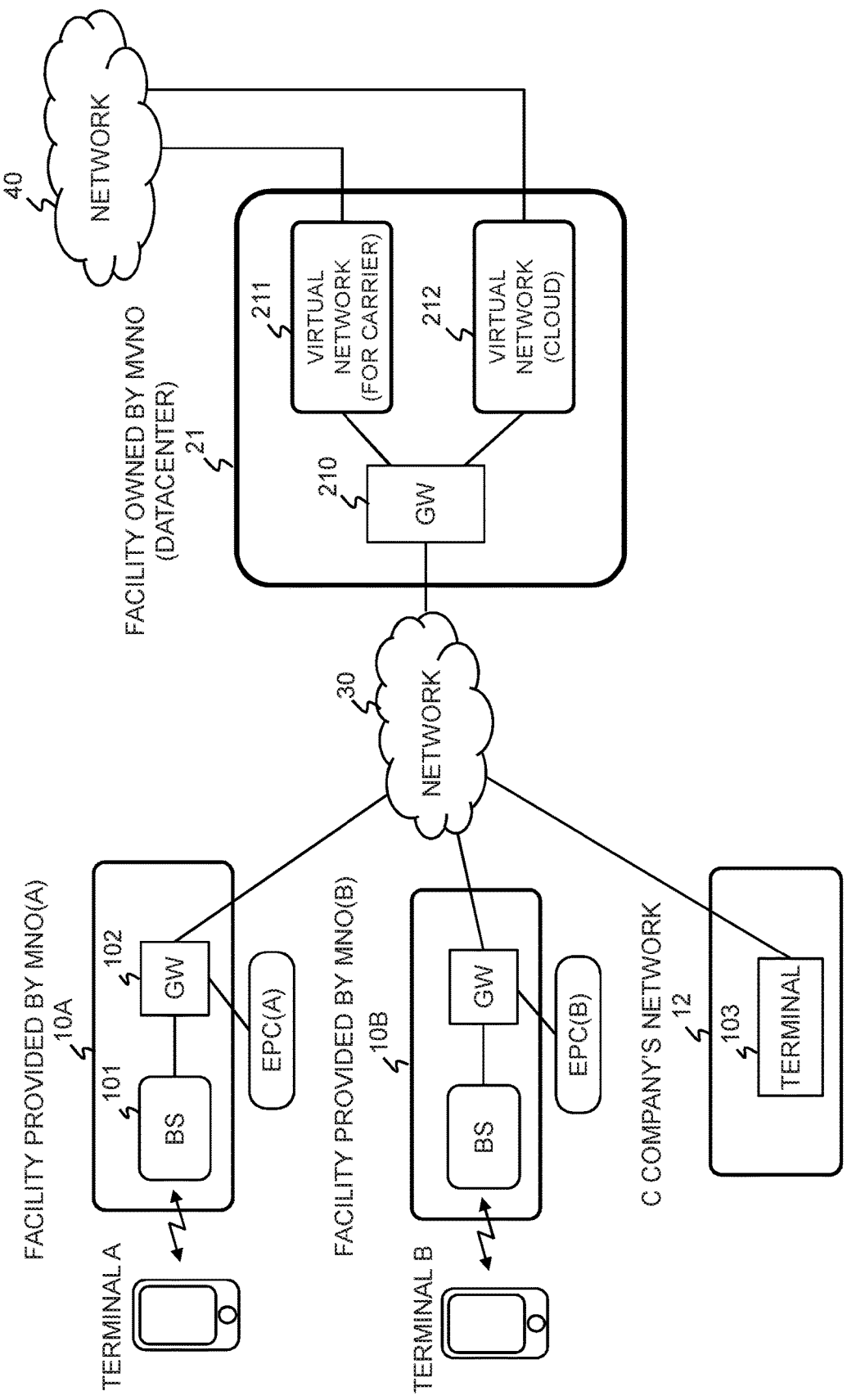
FIG. 7 is a network diagram showing the schematic architecture of a communication system according to a second exemplary embodiment of the present invention.

As illustrated in FIG. 7, a communication system according to the present exemplary embodiment includes a plurality of wireless communication facilities (10A, 10B), a network facility 12 to which a terminal of a virtual application user is connected, a datacenter 21, and a network 30 connecting the plurality of wireless communication facilities and network facility 12 to the datacenter 21. Here, it is assumed that different MNO(A) and MNO(B) own the wireless communication facilities 10A and 10B, respectively, another carrier (C company) owns the network facility 12, and an MVNO owns the datacenter 21. Note that a wireless communication facility 11 owned by the MVNO may be connected to the datacenter 21 via the network 30, as in the first exemplary embodiment.

The wireless communication facility 10A is part of the access network of a mobile communication network owned by the MNO(A) and is assumed to include at least a base station 101 and a gateway 102. Although one base station 101 is depicted here, an access network may be constructed, including a plurality of base stations 101 (e.g., eUTRAN (Evolved Universal Terrestrial Radio Network). Moreover, the MNO(A) also owns a core network EPC(A), and access from a terminal A here can be offloaded by the gateway 102 or can be forwarded to the datacenter 21 via the core network EPC(A) of the MNO(A) as well. The base station 101 performs wireless communication with the terminal A of a subscriber to the MNO(A), and the gateway 102 connects to the datacenter 21 via the network 30. It is assumed that the wireless communication facility 10B basically has a similar configuration.

The network facility 12 owned by C company can allow a terminal 103 to connect to the network 30. The terminal 103 connects to the datacenter 21 via the network 30, thus becoming able to receive a cloud service.

The datacenter 21 has a computing resource such as a computer and is connected to the network 30 via a gateway 210, and further a plurality of virtual networks connected to the gateway 210 are constructed within it independently of each other. Here, a virtual network 211 is the virtual core network implementing core network functions, and a virtual network 212 is an enterprise network for cloud computing. The virtual network 212 is provided for each corporate user. Note that the virtual core network 211 and the virtual network 212 may be constructed by using resources such as, for example, a virtual machine, a switch, and a router configured on a physical server.

Preferably, the gateway 210 forms a dedicated physical channel, or a protected logical channel passing over the network 30, with the gateway 102 of each wireless communication facility. Thereby, the base station of each wireless communication facility and the virtual network 211 or 212 can be connected, and the virtual network 211 is thus able to accommodate the radio access networks of the different MNOs.

Moreover, in the present exemplary embodiment, it is assumed that the user of the terminal 103 has signed a contract for a cloud service provided by the virtual network 212, whereby the terminal 103 can access the virtual network 212 for cloud computing via the network facility 12 and the network 30. For example, if the user of the terminal 103 is a subscriber to the MNO(A), the terminal 103 can access the virtual network 212 via the wireless communication facility 10A, or also can access the virtual network 212 via a network 40 by connecting to the virtual network 211.

The network 30 is an IP network such as the Internet, a RAN (Radio Access Network), or the like that connects the wireless communication facilities 10A, 10B and network facility 12 to the datacenter 21. Moreover, the network 40 connected to the virtual networks 211 and 212 is an external packet network or an IP network such as the Internet.

2.2) Datacenter

Next, a system will be described as an example in which a virtual core network (vEPC) for a carrier, as the virtual network 211, and an enterprise network for proving a cloud service such as IaaS or PaaS, as the virtual network 212, are constructed within a datacenter.

Fourth Example

Figure 8:
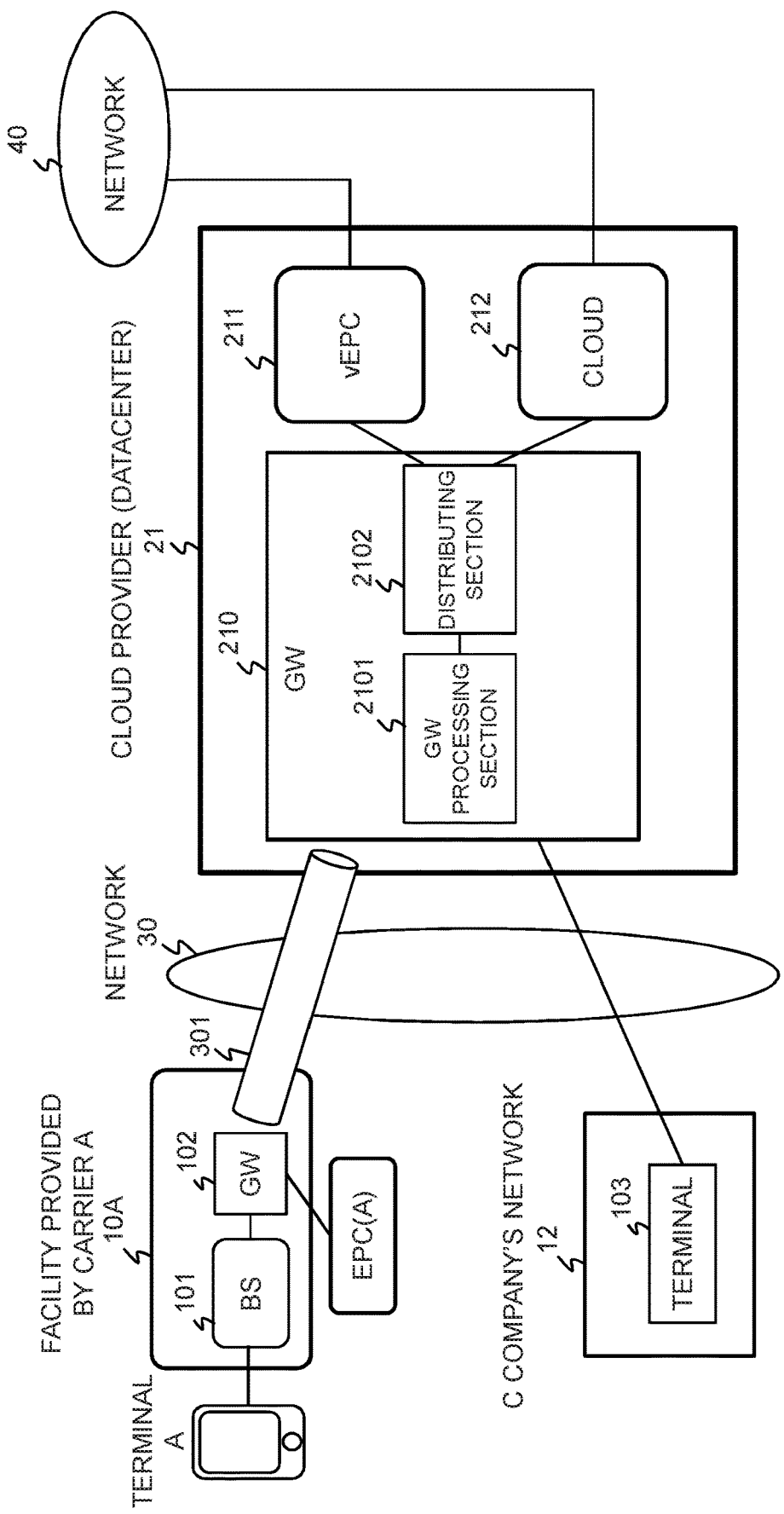
FIG. 8 is a network diagram showing the schematic architecture of a communication system according to a fourth example of the present invention.

As illustrated in FIG. 8, in a communication system according to a fourth example of the present invention, the vEPC 211 and the cloud 212 are constructed within the datacenter 21 of the cloud provider (MVNO), and the vEPC 211 and the cloud 212 are connected to the external network 40 and also connected to the network 30 via the gateway 210. The vEPC 211 and the cloud 212 operate on a computing resource (physical server, virtual server, virtual machine, or the like) within the datacenter 21 owned by the MVNO.

The gateway 210 includes a gateway processing section 2101 and a distributing section 2102, and the distributing section 2102 divides and distributes traffic for carrier and traffic of cloud users to the vEPC 211 and the cloud 212, respectively. The distributing of traffic by the distributing section 2102 can be performed per network or per communication facility, based on the identification of a source network ID, a destination, and/or a bearer or tunnel as described above. For example, the network ID or the identification of a tunnel can be performed by referring to part of a packet, or to an identifier indicating a network, user, service, or the like included in a packet, or alternatively to an input port number. Hereinafter, operation in the fourth example will be described with reference to FIGS. 9 and 10.

Figure 9:
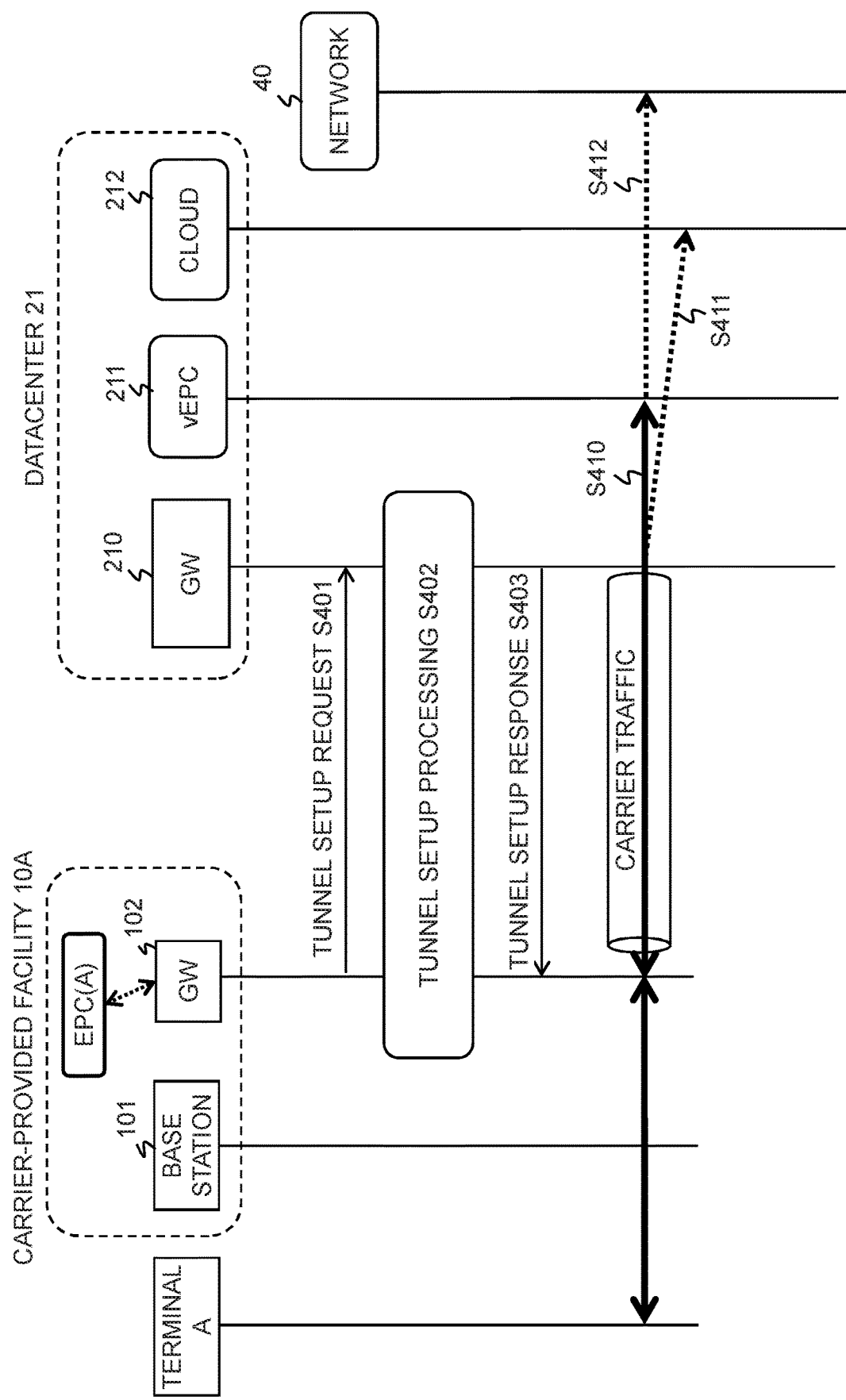
FIG. 9 is a sequence chart showing an example of operation in the communication system according to the fourth example.

Referring to FIG. 9, the wireless communication facility 10A provided by the carrier A includes the base station 101 and the gateway 102 as described above, and the gateway 101 terminates a tunnel between itself and the gateway 210 of the datacenter 21. It is assumed that the gateway 210 includes the gateway processing section 2101 and the distributing section 2102 as described above. Moreover, the carrier A also owns the core network EPC(A), and access from the terminal A here can be offloaded by the gateway 102 or can be forwarded to the datacenter 21 via the core network EPC(A) of the carrier A as well.

When a tunnel is set up between the gateway 102 of the carrier-provided facility 10A and the gateway 210 of the datacenter 21 through a predetermined procedure (Operations S401 to S403) as illustrated in FIG. 9, the terminal A becomes able to access the vEPC 211 or cloud 212 within the datacenter 21 through this tunnel.

For example, traffic for carrier offloaded by the gateway 102 is distributed to the vEPC 211 by the distributing section 2102 of the gateway 210 (Operation S410). Moreover, when traffic for carrier from the terminal A is addressed to the cloud 212 and passes through the core network EPC(A) of the carrier A, the distributing section 2102 of the gateway 210 distributes this traffic directly to its destination, the cloud 212 (Operation S411).

Furthermore, it is also possible that only part of the functions of the core network EPC(A) is constructed in the vEPC 211 and the core network EPC(A) is used for the rest of the functions. For example, when traffic for carrier from the terminal A passes through part of the functions of the core network EPC(A) of the carrier A, the distributing section 2102 of the gateway 210 distributes this traffic for carrier to the vEPC 211, whereby it is possible to have the traffic pass through the other EPC functions, and then send it to the network 40 (Operation S412).

Figure 10:
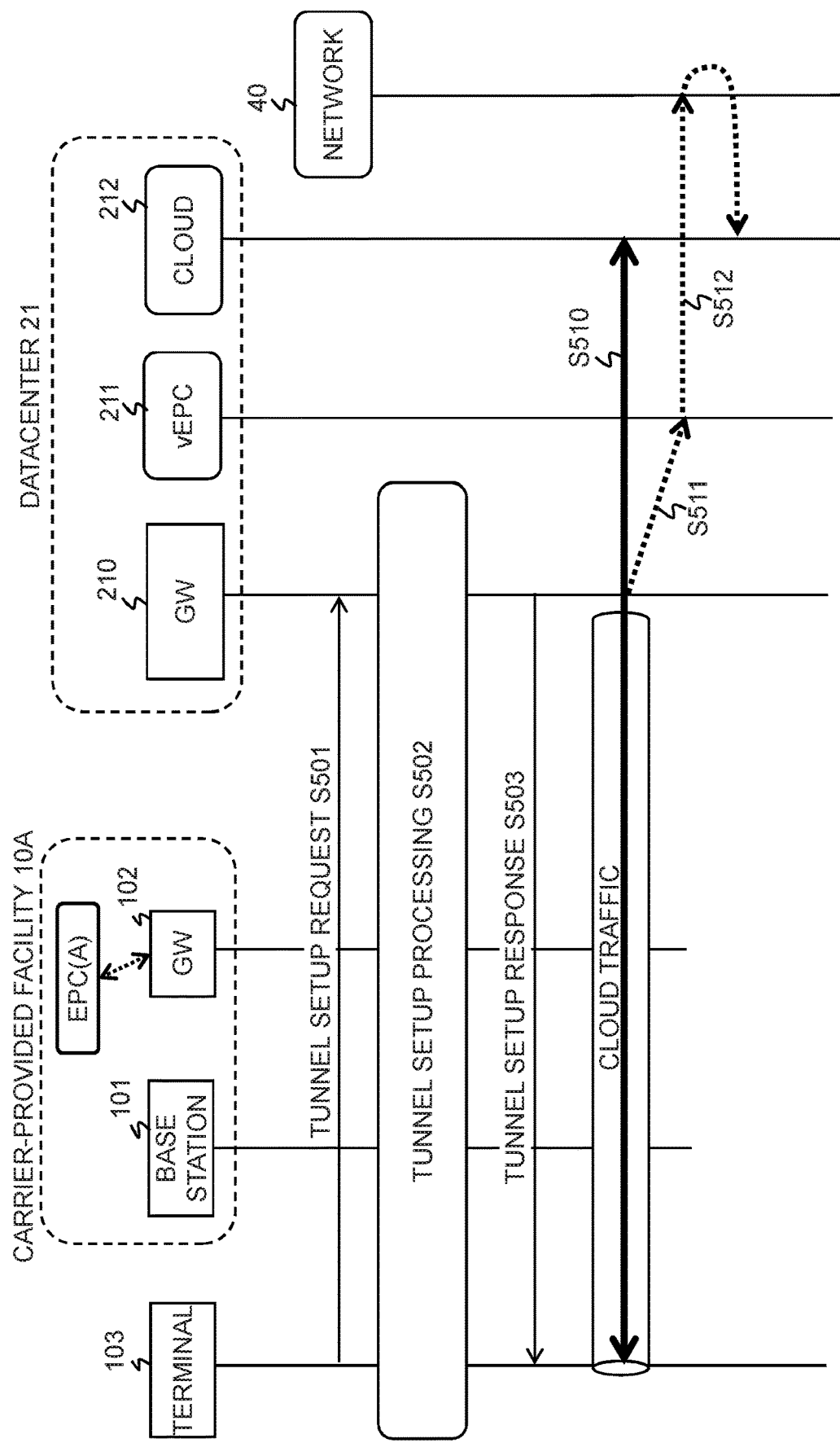
FIG. 10 is a sequence chart showing another example of operation in the communication system according to the fourth example.

As illustrated in FIG. 10, when a tunnel is set up between the terminal 103 that has connected to the network 30 through the network facility 12 owned by C company and the gateway 210 of the datacenter 21 through a predetermined procedure (Operations S501 to S503), the terminal 103 becomes able to access the cloud 212 through this tunnel via the vEPC 211 within the datacenter 21 or directly.

For example, traffic for cloud computing is directly distributed to the cloud 212 by the distributing section 2102 of the gateway 210 (Operation S510). Moreover, when access is made to the cloud 212 via EPC, traffic for cloud computing is distributed to the vEPC 211 by the distributing section 2102 of the gateway 210 (Operation S511) and forwarded to the cloud 212 from the vEPC 211 via the network 40 (Operation S512).

Next, examples of the path of traffic in the system shown in FIG. 8 will be described with reference to FIGS. 11 and 12.

Figure 11:
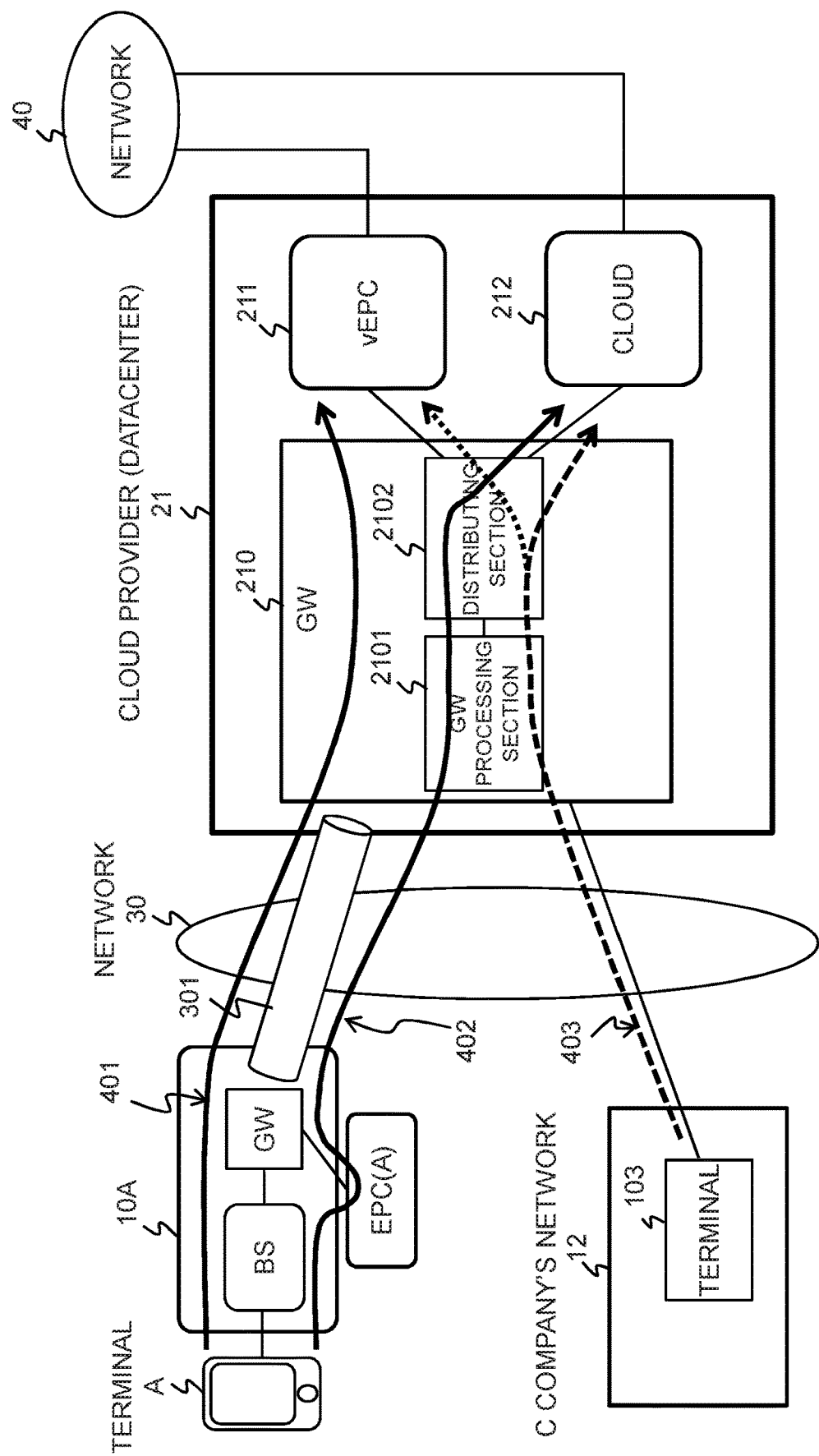
FIG. 11 is a schematic network diagram showing an example of operation in the communication system according to the fourth example.

FIG. 11 illustrates several paths of traffic in the present example. When traffic from the terminal A is offloaded by the gateway 102, this traffic is forwarded to the vEPC 211 in the datacenter 21 through a path 401. For example, when the source of traffic is the radio access network of the carrier A, the distributing section 2102 forwards this traffic to the vEPC 211.

Moreover, when traffic from the terminal A to the cloud 212 is forwarded to the EPC(A) of the carrier A without being offloaded, this traffic is forwarded to the cloud 212 in the datacenter 21 through a path 402. For example, when the source of traffic is the EPC(A) of the carrier A and the destination thereof is the cloud 212, the distributing section 2102 forwards this traffic to the cloud 212.

Note that when traffic whose destination is the cloud 212 is offloaded by the gateway 102, this traffic is forwarded to the vEPC 211 in the datacenter 21 through the path 401 and then forwarded to the cloud 212 via the network 40.

Furthermore, when the terminal 103 of a cloud user accesses the cloud 212 by using the network facility 12 owned by C company, traffic from the terminal 103 is forwarded to the cloud 212 in the datacenter 21 through a path 403. For example, when the source of traffic is C company's network 12 and the destination thereof is the cloud 212, the distributing section 2102 forwards this traffic to the cloud 212.

Figure 12:
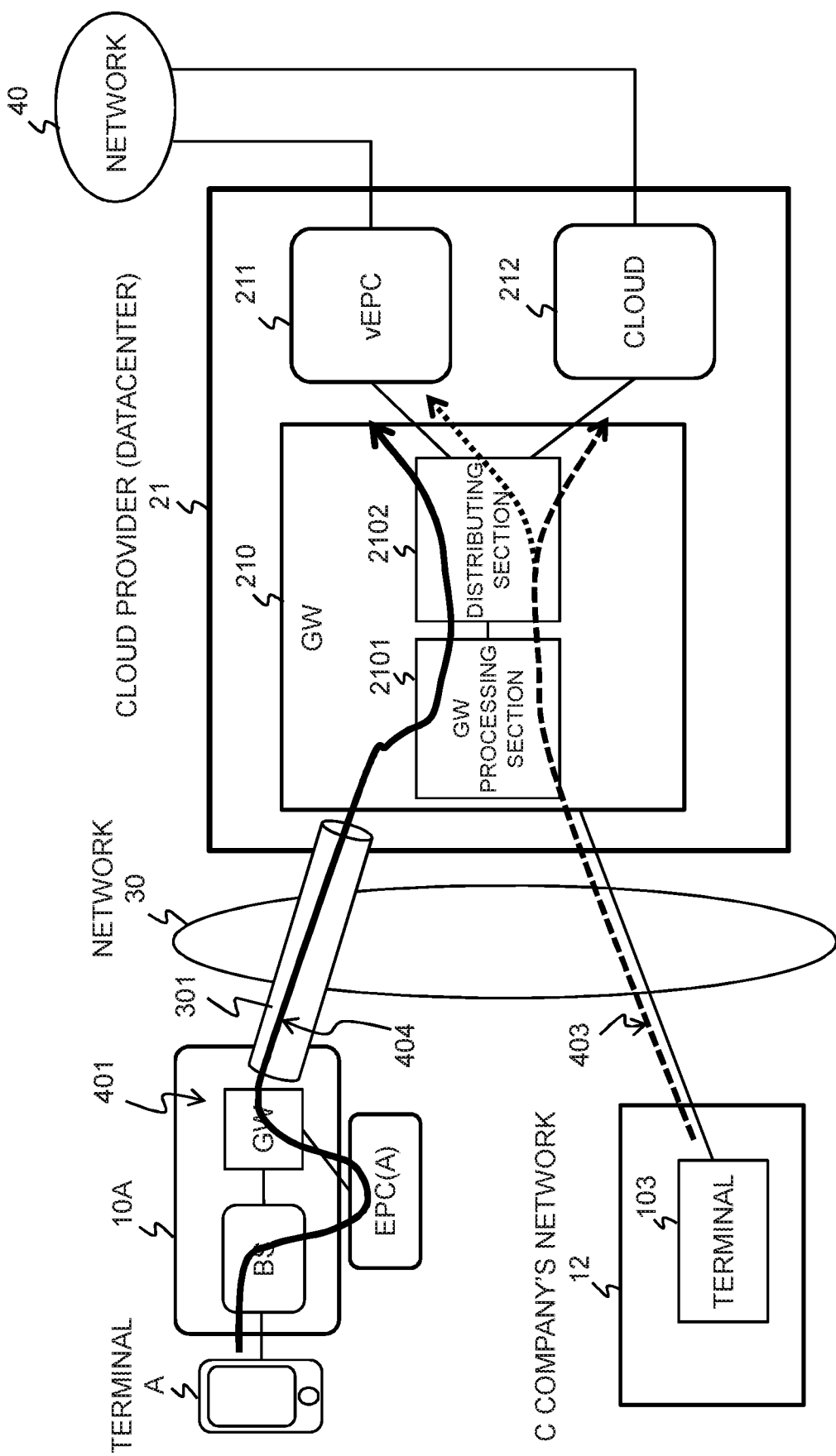
FIG. 12 is a schematic network diagram showing another example of operation in the communication system according to the fourth example.

Further, as shown in FIG. 12, it is also possible that traffic travels via both the EPC(A) and the vEPC 211 like a path 404. In this case, the vEPC 211 in the datacenter 21 only has part of the functions constituting an EPC, and functions of the EPC(A) of the carrier A are virtually used for the rest of the functions. For example, when the vEPC 211 only has P-GW function and HSS function, functions up to S-GW of the EPC(A) are used. Alternatively, when the vEPC 211 only has accounting function and customer information and authentication function, S-GW, P-GW and HSS of the EPC(A) are used. As described above, such a configuration is also possible that implements the functions of a core network by passing through both the EPC(A) owned by the carrier A and the vEPC 211 within the datacenter 21. In this case, the EPC(A) is shared by the carrier A, which is an MNO, and the cloud provider, which is an MVNO, and used in a physically or virtually separated manner via the network.

Note that in the fourth example, a bearer termination section may be provided to the datacenter 21 as in the first example shown in FIG. 3. Alternatively, a tunnel termination section can also be provided to the gateway 210 as in the second example shown in FIG. 4.

2.3) Effects

As described above, according to the second exemplary embodiment of the present invention, a virtual core network for a carrier and a virtual network for providing a cloud service to users are independently constructed within a datacenter, and traffic is distributed to either the virtual core network or the virtual network, whereby it is possible to enhance the versatility of the datacenter and thus to achieve the efficient use of the virtual network.

INDUSTRIAL APPLICABILITY

The present invention can be applied to a communication system including a datacenter.

Application software in accordance with the present disclosure, such as computer programs executed by the device and may be stored on one or more computer readable mediums. It is also contemplated that the steps identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

REFERENCE SIGNS LIST 10A, 10B Wireless communication facility of MNO
11 Wireless communication facility of MVNO
12 Communication facility of another carrier
20, 21 Datacenter
30, 40 Network
101 Base station
102 Gateway
103 Terminal
201 Virtual core network (vEPC)
202 Gateway
203 Bearer termination section
210 Gateway
211 Virtual network for carrier
212 Virtual network for cloud computing
301-303 Tunnel (virtual path)
401-403 Path of traffic
2021 Tunnel termination section
2022 Gateway processing section
2101 Gateway processing section
2102 Distributing section

The invention claimed is:

1. A communication system comprising:
a first wireless communication facility operated by a first mobile network operator;
a second wireless communication facility operated by a second mobile network operator; and
a data center operated by a mobile virtual network operator, wherein the data center is configured to:
receive traffic from a device through the first communication facility or the second communication facility; and
send the traffic to a mobile virtual network realizing a mobile network function operated by the mobile virtual network operator,
wherein the traffic is from the device subscribed to a service operated by the mobile virtual network operator.

2. The communication system according to claim 1, wherein the data center is connected to the first wireless communication facility and the second wireless communication facility via a physical channel or a logical channel.

3. The communication system according to claim 1, wherein the data center terminates a bearer between the data center and one of a first user terminal, a second user terminal and a third user terminal.

4. The communication system according to claim 1, wherein the data center terminates a tunnel between the data center and one of a first user terminal, a second user terminal and a third user terminal.

5. The communication system according to claim 1, wherein the mobile virtual network operator is different from the first mobile network operator, and
wherein the mobile virtual network operator is different from the second mobile network operator.

6. A data center operated by a mobile virtual network operator, the data center comprising:
a mobile virtual network operated by a mobile virtual network operator; and
a gateway configured to:
communicate with a first wireless communication facility operated by a first mobile network operator and a second wireless communication facility operated by a second mobile network operator;
receive traffic from a device through the first wireless communication facility or the second wireless communication facility; and
send the traffic to a mobile virtual network realizing a mobile network function operated by the mobile virtual network operator,
wherein the traffic is from the device subscribed to a service operated by the mobile virtual network operator.

7. The data center according to claim 6, wherein the data center is connected to the first wireless communication facility and the second wireless communication facility via a physical channel or a logical channel.

8. The data center according to claim 6, wherein the data center terminates a bearer between the data center and one of a first user terminal, a second user terminal and a third user terminal.

9. The data center according to claim 6, wherein the data center terminates a tunnel between the data center and one of a first user terminal, a second user terminal and a third user terminal.

10. A communication method comprising:
communicating to a mobile virtual network, in a data center, realizing a mobile network function operated by a mobile virtual network operator;
receiving traffic from a device through a first communication facility operated by a first mobile network operator, or a second communication facility operated by a second mobile network operator; and
sending the traffic to the mobile virtual network,
wherein the traffic is from the device subscribed to a service operated by the mobile virtual network operator.

11. The communication method according to claim 10, wherein the data center is connected to the first wireless communication facility and the second wireless communication facility via a physical channel or a logical channel.

12. The communication method according to claim 10, wherein the data center terminates a bearer between the data center and one of a first user terminal, a second user terminal and a third user terminal.

13. The communication method according to claim 10, wherein the data center terminates a tunnel between the data center and one of a first user terminal, a second user terminal and a third user terminal.

* * * * *